United States Patent [19]

Pottick et al.

[11] Patent Number: 5,218,033

[45] Date of Patent: Jun. 8, 1993

[54] FUNCTIONALIZED VINYL AROMATIC/CONJUGATED DIOLEFIN BLOCK COPOLYMER AND SALT OF FATTY ACID COMPOSITIONS

[75] Inventors: Lorelle A. Pottick; Carl L. Willis, both of Houston, Tex.

[73] Assignee: Shell Oil Company, Houston, Tex.

[21] Appl. No.: 796,881

[22] Filed: Nov. 25, 1991

Related U.S. Application Data

[63] Continuation of Ser. No. 624,023, Dec. 7, 1990, abandoned.

[51] Int. Cl.$^5$ ............... C08L 53/02; C08L 25/10; C08K 5/09
[52] U.S. Cl. ............... 524/399; 524/398; 524/400; 525/98; 525/366
[58] Field of Search ............... 524/398, 399, 400

[56] References Cited

U.S. PATENT DOCUMENTS

| | | | |
|---|---|---|---|
| Re. 27,145 | 6/1971 | Jones | 526/22 |
| 3,231,635 | 1/1966 | Holden et al. | 260/880 |
| 3,251,905 | 5/1966 | Zelinski | 260/879 |
| 3,265,765 | 8/1966 | Holden et al. | 260/876 |
| 3,322,856 | 5/1967 | Holden et al. | 260/876 |
| 3,390,207 | 6/1968 | Moss et al. | 260/879 |
| 3,494,942 | 2/1970 | Miki et al. | 260/397.5 |
| 3,634,549 | 1/1972 | Shaw et al. | 260/880 B |
| 3,639,521 | 2/1972 | Hsieh | 260/880 |
| 3,670,054 | 6/1972 | De La Mare et al. | 260/880 B |
| 3,700,633 | 10/1972 | Wald et al. | 260/880 B |
| 3,847,854 | 11/1974 | Canter et al. | 260/23.7 M |
| 3,870,841 | 3/1975 | Makowski et al. | 260/23.7 R |
| 3,939,242 | 2/1976 | Lundberg et al. | 264/294 |
| 3,976,628 | 8/1976 | Halasa et al. | 526/22 |
| 4,033,888 | 7/1977 | Kiovsky | 252/56 D |
| 4,077,893 | 3/1978 | Kiovsky | 252/56 R |
| 4,118,362 | 10/1978 | Makowski et al. | 260/32.6 |
| 4,137,203 | 1/1979 | Makowski et al. | 260/23.5 A |
| 4,141,847 | 2/1979 | Kiovsky | 252/51.5 A |
| 4,143,185 | 3/1979 | Lundberg et al. | 427/314 |
| 4,145,298 | 3/1979 | Trepka | 252/51.5 A |
| 4,145,379 | 3/1979 | Lundberg | 260/879 |
| 4,208,356 | 6/1980 | Fukawa et al. | 525/89 |
| 4,219,627 | 8/1980 | Halasa et al. | 525/89 |
| 4,330,447 | 5/1982 | Lundberg et al. | 524/400 |
| 4,391,949 | 7/1983 | St. Clair | 525/99 |
| 4,444,953 | 8/1985 | St. Clair | 525/98 |
| 4,536,547 | 8/1985 | Lundberg et al. | 525/186 |
| 4,543,385 | 9/1985 | Agarwal et al. | 524/518 |
| 4,617,337 | 10/1986 | Lundberg et al. | 525/399 |
| 4,840,982 | 6/1989 | Campbell et al. | 524/151 |
| 4,868,245 | 9/1989 | Pottick et al. | 525/98 |
| 5,002,997 | 3/1991 | Gelles et al. | 524/505 |

FOREIGN PATENT DOCUMENTS

| | | | |
|---|---|---|---|
| 178797 | 4/1986 | European Pat. Off. | |
| 0079166 | 6/1981 | Japan | 524/399 |

OTHER PUBLICATIONS

C. Bazuin-A. Eisenberg, "Dynamic Mechanical Properties of Plasticized Polystyrene-Based Ionomers", J. Pol. Sc., vol. 24, 1137-1153.

R. D. Lundberg-H. S. Makowski-L. Westerman, "Dual Plasticization of Sulfonated Ionomer", Amer. Chem. Soc. (1980), pp. 68-76.

*Primary Examiner*—Paul R. Michl
*Assistant Examiner*—Andrew E. C. Merriam

[57] ABSTRACT

A salt of a fatty acid is provided as a plasticizer for functionalized block copolymers of vinyl aromatics and conjugated diolefins wherein the functionalization comprises salt functionality. When this functionalized block copolymer is plasticized with the salt of a fatty acid the resulting composition will have higher tensile strengths than the raw polymer at and below the melting point of the additive and will have improved processability.

6 Claims, No Drawings

FUNCTIONALIZED VINYL AROMATIC/CONJUGATED DIOLEFIN BLOCK COPOLYMER AND SALT OF FATTY ACID COMPOSITIONS

This is a continuation of application Ser. No. 07/624,023, filed Dec. 7, 1990 now abandoned.

FIELD OF THE INVENTION

This invention relates to an improved polymeric composition comprising salts of fatty acids and functionalized block copolymers of conjugated diolefins and vinyl aromatics and to the use of salts of fatty acids as plasticizers for these functionalized block copolymers.

BACKGROUND OF THE INVENTION

Block copolymers of styrene and conjugated diolefins have long been known as useful as elastomeric thermoplastics. These block copolymers are referred to as thermoplastic polymers because they may be worked by heating the polymer to above the polymer's melting temperature, and then processing by such methods as vacuum forming, extrusion, compression molding, calendering or blow molding. These block copolymers have good tear resistance, flexibility, thermomechanical stability and other properties.

The thermoplastic properties of block copolymers of styrene and conjugated diolefins are the result of incompatibility between the polystyrene and the polydiolefin polymeric blocks which causes separate polymeric phases to exist. At service temperatures, the polydiolefin domains are rubbery and elastic, whereas the polystyrene domains are hard and glassy. The polystyrene domains serve as physical crosslinks between the rubbery polydiolefin blocks. This causes the polymer to behave much like a vulcanized rubber at temperatures which are below the polystyrene glass transition temperature. By heating the block copolymer to a temperature higher than the glass transition temperature of the polystyrene domains, the polymer may be processed as a melt and formed into useful shapes.

Although these polymers are processable in commercial polymer handling equipment and have many excellent properties, they have short-comings. The glass transition temperature of the polystyrene domains limit the polymer's maximum service temperature. Further, these polymers are not compatible with polar engineering thermoplastics, causing difficulty in making polymeric blends with these materials. Adhesion to polar substrates and polar coatings is also generally not good, and solvent resistance of these polymers is deficient.

It has been found that these shortcomings can be partially overcome by incorporating polar functional groups into the polymers. It has been found to be particularly advantageous to incorporate metal salt functional groups into the polystyrene blocks. Ionic bonds between metal salt groups increase the glass transition temperatures of the polystyrene phases and render the polystyrene phases significantly less soluble in nonpolar solvents. The ionic bonds also increase the mechanical integrity of the polystyrene domains. As a result, the polymer's solvent resistance, high temperature properties and tensile strength are significantly increased by incorporating metal salt functionality into the polystyrene domains. Polymers which include metal salt functionality are commonly referred to as ionomers. Incorporation of metal salt of carboxylic acid functionality into the styrene blocks of such a polymer may increase the service temperature to 120° C. or higher. The same block copolymer without functionality is limited to service temperatures of about 100° C.

Unfortunately, incorporation of metal salt functionality into styrene blocks of these block copolymers is detrimental to processability. The ionic interactions which cause the improvements in the block copolymer's mechanical properties at service temperatures remain active above the glass transition temperature of the polystyrene domains. These ionic interactions interfere with the processability of the polymer melts by raising the viscosities of the melts. Typical plasticizers, such as processing oils, glycerols, dioctyl phthalate, diethyl phthalate, and dioctyl succinate, improve processability of styrene block functionalized styrene-butadiene block copolymers, but only at the expense of many of the physical properties which the functionalization is intended to improve. These plasticizers are liquids at polymer service temperatures, and as such they tend to decrease the glass transition of the styrene domains, decrease the composition's modulus and decrease the composition's tensile strength.

Other ionomers are also difficult to process, and plasticizers for some of them have been developed. Terpolymers of ethylene-propylene and diolefins, such as EPDM, which are sulfonated and then neutralized with metal ions to produce salt functionality are commercially available. The ionic crosslinks of these polymers serve many of the same functions as the styrene blocks of the styrene-conjugated diene block copolymers. The ionic crosslinks tie polymer chains together which results in properties like vulcanized rubber, but the ionic crosslinks are broken at elevated temperatures with the aid of a plasticizer. Preferred plasticizers for salts of sulfonated EPDM include zinc stearate and aliphatic organic amides. The use of these plasticizers with ionomers of EPDM is taught in U.S. Pat. Nos. 3,847,854 and 4,137,203. These plasticizers are referred to as ionic plasticizers because they function by relaxing ionic bonds, as opposed to backbone plasticization which is accomplished by enhancing slippage between polymeric backbones.

Zinc stearate and other metal salts of fatty acids are structurally similar to polymers such as EPDM and hydrogenated polyconjugated diolefins and would therefore by expected to function effectively as plasticizers for ionomers of these polymers. U.S. Pat. No. 4,137,203 demonstrates that zinc stearate is not only an excellent plasticizer for EPDM, but at concentrations between about 10 and 60 parts by weight per 100 parts by weight of polymer it doubles as an excellent reinforcing filler. These compositions have tensile strengths at room temperature which are up to four times the raw polymer tensile strength.

As opposed to EPDM and hydrogenated polyconjugated diolefins, fatty acids and metal salts thereof are incompatible with polymerized vinyl aromatics such as polystyrene. When acids or metal salts thereof are combined with ionomers of hydrogenated block copolymers of vinyl aromatics and conjugated diolefins, it is expected that the fatty acids would partition to the conjugated diolefin domains. If the fatty acids or metal salts thereof are predominately in the conjugated diolefin domains, it is not expected that they would be effective in plasticization of the ionomeric links in the poly(vinyl aromatic) domains.

The present inventors have surprisingly found that salts of fatty acids are effective plasticizers for vinyl aromatic block functionalized block copolymers of vinyl aromatics and conjugated diolefins. Further, they have also surprisingly found that metal salts of fatty acids are effective as reinforcing fillers when incorporated into these polymeric compositions.

It is therefore an objective of the present invention to provide a plasticizer for functionalized block copolymers, the functionalized block copolymer comprising at least one vinyl aromatic block and at least one conjugated diolefin olefin block in which the functionality comprises acid or metal salt functionality incorporated in the vinyl aromatic blocks wherein the plasticizer does not significantly reduce the 70° C. properties of the polymer and which acts as a reinforcing filler at temperatures at or below 70° C. In another aspect, it is an objective of this invention to provide a composition comprising such a functionalized block copolymer and a plasticizer which may be processed at temperatures typical of commercial polymer melt processing equipment.

SUMMARY OF THE INVENTION

The objectives of the present invention are accomplished by providing a metal salt of a fatty acid as a plasticizer for a functionalized polymer, the functionalized block copolymer comprising at least one block comprising predominately vinyl aromatic monomer units, at least one block comprising predominately conjugated diolefin units, and functionality comprising salt functionality within at least one predominately vinyl aromatic block. In another aspect, a process to plasticize these functionalized polymers by incorporating a salt of a fatty acid is provided. When these functionalized block copolymers are plasticized with the salt of a fatty acid the resulting polymeric composition retains excellent physical properties at temperatures at or below the melting point of the additive, excellent tensile strength at this temperature and below while being acceptably processable.

In a preferred embodiment, the salt of the fatty acid is a metal salt of a stearic acid, and in a most preferred embodiment, the metal salt of stearic acid is zinc stearate at a concentration of about 10 to about 70 parts by weight based on 100 parts by weight of functionalized block copolymer.

DETAILED DESCRIPTION OF THE INVENTION

The functionalized block copolymer may comprise functional groups incorporated into the polymer by grafting the functional groups to vinyl aromatic blocks or alternatively by copolymerizing functional group containing monomers with vinyl aromatic monomer units. The block copolymer may be linear, branched, coupled or radial because the invention does not depend on any specific geometrical structure, but rather on the chemical constituents of each of the polymer blocks. The radial, or star, block copolymer may be symmetric or asymmetric. The polymer may also be a grafted block copolymer. The only requirement being that the blocks phase separate into aromatic and aliphatic domains.

The block copolymer may be produced by any block polymerization procedure including sequential addition of monomer techniques, incremental addition of monomer techniques, or various coupling techniques. Tapered copolymer techniques may also be used.

Useful linear block copolymers include linear block copolymers such as those described in U.S. Pat. Nos. 3,231,635; 3,265,765 and 3,322,856, which are incorporated herein by reference. In general, linear and branched block copolymers include those that may be represented by the general formula:

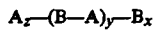

$$A_z—(B—A)_y—B_x$$

wherein:
A is a linear or branched polymeric block comprising predominantly vinyl aromatic hydrocarbon monomer units (referred to as Block A);
B is a linear or branched polymeric block containing predominantly conjugated diolefin monomer units (referred to as Block B);
x and z are, independently, a number equal to 0 or 1; and
y is a whole number ranging from 1 to about 20.

Radial block copolymers include polymers of the type described in U.S. Pat. Nos. 4,033,888; 4,077,893; 4,141,847; 4,391,949 and 4,444,953, which are also incorporated herein by reference. Coupled and radial block copolymers include those that may be represented by the general formula:

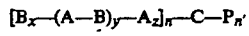

$$[B_x—(A—B)_y—A_z]_n—C—P_{n'}$$

wherein:
A, B, x, y and z are as previously defined;
n and n' are, independently, numbers from 1 to about 40 such that n+n' is greater than or equal to 3;
C is the core of the coupled or radial polymer formed with a polyfunctional coupling agent having two or more functional groups; and
each P is the same or a different polymer block or polymer segment having the general formula:

$$B'_{x'}—(A'—B'')_{y'}—A''_{z'}$$

wherein:
A'' is a polymer block containing predominantly vinyl aromatic hydrocarbon monomer units which may be the same or different from A;
B' is a polymer block containing predominantly conjugated diolefin monomer units which may be the same or different from B;
A'—B'' is a polymer block containing vinyl aromatic hydrocarbon monomer units (A') and conjugated diolefin monomer units (B''), the A'—B'' monomer units may be random, tapered or block and when each of A' and B'' is blocked, the A' block may be the same or different from A'' and B'' may be the same or different from B';
x' and z' are, independently, numbers equal to 0 or 1; and
y' is a number from 0 to about 20, with the proviso that the sum of x', y' and z' is greater than or equal to 1.

Blocks A and B may be either homopolymer, random or tapered copolymer blocks as long as each block predominates in at least one class of the monomers characterizing the block. Thus, blocks A may comprise styrene styrene/alpha-methylstyrene copolymer blocks or styrene/butadiene random or tapered copolymer blocks as long as the blocks individually predominate in vinyl aromatics. The A blocks are preferably vinyl aromatic homopolymeric blocks. The term "vinyl aromatic" will be taken to include particularly those of the benzene series such as styrene and its analogs and homologs including alpha-methylstyrene and ring alkylated styrenes, particularly ring-methylated styrenes, and other vinyl polycyclic aromatic compounds such as vinyl naphthalene and the like. The preferred vinyl aromatics are styrene and alpha-methylstyrene, and styrene is most preferred.

The block B may comprise homopolymers of conjugated diene monomers, copolymers of two or more conjugated dienes, and copolymers of one of the dienes with a vinyl aromatics as long as the block B predominates in conjugated diene units. The conjugated dienes are preferably ones containing from 4 to 8 carbon atoms. Examples of suitable such conjugated diene monomers include: butadiene, isoprene, 2,3-dimethyl-1,3-butadiene, and piperylene, preferably butadiene and isoprene.

Block copolyers comprising two or more vinyl aromatic blocks separated by at least one conjugated diolefin block are preferred. These polymers form "networks" of connected vinyl aromatic domains which result in a composition having significant tensile strength.

As used in connection with polymer block composition, "predominantly" shall mean that the specified monomer or monomer type shall constitute at least about 85 wt % of the total monomer content of that block.

Anionic polymerization methods which may be used to prepare the base block copolymers of this invention are described in U.S. Pat. Nos.; 3,390,207; 4,219,627; 3,251,905; 3,265,765; 3,639,521; 4,208,356; 3,231,635; 3,322,856; 4,391,949; and 4,444,953, which are incorporated herein by reference. Although methods to prepare diblock copolymers are not specifically disclosed in these patents, these processes are readily adaptable to prepare diblocks by termination after only two blocks have been formed.

The base block copolymers of conjugated dienes and vinyl aromatics which may be utilized in this invention include polybutadiene block containing copolymers which have a polybutadiene 1,2-microstructure content of from about 7% to about 100%, preferably from about 25% to about 65%, more preferably 35% to 55%. These polymers have excellent elasticity due to the microstructure of the polybutadiene blocks.

Block copolymers useful in this invention may contain various ratios of conjugated dienes to vinyl aromatics. The proportion of the vinyl aromatic monomer units in these block copolymers will preferably be between about 1 and about 60 weight percent by weight and more preferably between about 5 and about 40 percent by weight.

The number average molecular weights of the individual blocks may vary within certain limits. In most instances, the vinyl aromatic blocks will have number average molecular weights of about one vinyl aromatic monomer unit per block to a number average molecular weight of about 125,000, and preferably between number average molecular weights of about 1,000 and about 60,000. Conjugated diolefin blocks will preferably have number average molecular weights of from about 10,000 to about 450,000, and preferably from about 10,000 to about 150,000. These molecular weights are most accurately determined by gel permeation chromatography and/or low angle light scattering techniques.

The base block copolymer may optionally be hydrogenated. Hydrogenation improves thermal, oxidative and U.V. stability of conjugated diolefin containing polymers and is therefore preferred. When the base block copolymer is hydrogenated, selective hydrogenation is preferred. Selective hydrogenation refers to hydrogenation of the ethylenic unsaturation while the aromatic saturation remains unhydrogenated.

Hydrogenation of the polymer may be accomplished using any of the methods known in the prior art. The hydrogenation will preferably be selective hydrogenation accomplished using a method such as those taught in U.S. Pat. Nos. 3,494,942; 3,634,549; 3,670,054; 3,700,633 and Re 27,145, which are incorporated herein by reference. Most preferably, selective hydrogenation will be accomplished using one of the processes taught in U.S. Pat. No. 3,700,633. These hydrogenation processes involve the use of a suitable catalyst, particularly a catalyst or catalyst precursor comprising an iron group metal compound. In the methods described in the foregoing patents, the catalyst is prepared by combining an iron group metal, particularly a nickel or cobalt compound with a suitable reducing agent such as an aluminum alkyl. The preferred iron group metal compounds are carboxylates and alkoxides.

The block copolymer is preferably selectively hydrogenated so as to convert (hydrogenate) at least about 80 percent and most preferably greater than 98 percent of the initial ethylenic unsaturation. Preferably, less than 10 percent and most preferably less than 2 percent of the initial aromatic unsaturation is hydrogenated to obtain the maximum benefits of hydrogenation.

Preferred base block copolymers which have demonstrated utility in the present invention include those with the structure of polystyrene-hydrogenated polybutadiene-polystyrene and polystyrene-hydrogenated isoprene.

The incorporation of the carboxyl functional group into the aromatic portion of the block copolymer may be accomplished by first metalating the base block copolymer in a manner such as that taught in U.S. Pat. Nos. 3,976,628 and 4,868,245 which are incorporated herein by reference. These processes include reacting the base block copolymer with a metal alkyl, such as s-butyllithium. The reaction of the metal alkyl with the vinyl aromatic containing polymer results in addition of the metal ions primarily to aromatic groups, replacing hydrogen, and releasing an alkane. When ethylenic unsaturation exists in the base block copolymer, some metal ions may also be added in positions allyl to the ethylenic unsaturation.

Metalation of the base block copolymer is preferably accomplished in the presence of a polar metalation promoter. Although the metalation can take place without the polar metalation promoter, the reaction requires either extended time periods or excessive temperatures. The polar metalation promoters include a variety of tertiary diamines, bridgehead amines, ethers, and metal alkoxides. The tertiary diamines useful in the metalation step have three saturated aliphatic hydrocarbon groups attached to each nitrogen.

Functionalization with carboxylic functionality is completed by reacting the metalated polymer with carbon dioxide or another electrophile such as those taught in U.S. Pat. No. 4,145,298, which is incorporated herein by reference. Reactants may be polymerizable or nonpolymerizable but preferred reactants are nonpolymerizable or slowly polymerizable. This prevents or minimizes the formation of oligomers of the electrophile on the base polymer. The reaction product of the metalated polymer and the carbon dioxide is a carboxylic acid salt. The salt can be converted to an acid by contacting the functionalized hydrogenated block copolymer with an acid. A most preferred acid is acetic acid due to its excellent solubility in acceptable solvents for the metalated block copolymer.

Block copolymers of vinyl aromatics and conjugated diolefins which have sulfonic functionality grafted in the vinyl aromatic blocks may be prepared by the method described in U.S. Pat. No. 3,870,841, which is incorporated herein by reference. The preferred method of grafting sulfonic functionality to the vinyl aromatic blocks is by reacting the block copolymer with acyl sulfate ($RCO_2SO_3H$), which adds a sulfonic acid, $-SO_3H$, group to the aromatic ring of the polymer, and releases the organic acid ($RCO_2H$). The preferred acyl sulfate is acetyl sulfate in which R is a methyl group. This reaction requires the absence of water since water will react with the acyl sulfate producing sulfonic acid and the organic acid.

Acyl sulfates are preferably prepared in situ, due to the propensity of acyl sulfates to sulfonate themselves by the following reaction:

A preferred method for preparing acyl sulfates in situ is to react acetic anhydride with sulfuric acid according to the following reaction:

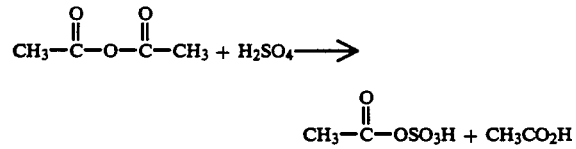

Utilization of an excess of acetic anhydride has the additional advantage of scavenging trace amounts of water which may be present.

The acid functionalized polymers may then be neutralized to form metal salts by reaction with metal hydroxides or metal acetates. Metal acetates are preferred because they can be contacted with the acid functionalized polymer in a solution with an inert solvent. Zinc acetate is most preferred to neutralize the polymeric acid functionality.

The amount of functionality incorporated onto the polymer may vary over a wide range in the practice of the present invention. At least about an average of one functional group per polymer molecule is necessary for the properties of the polymer to be appreciably effected by the functionalization. It is preferred that the amount of functionalization be in the range of from about 1 functional groups per polymer molecule to about 2 functional groups per aromatic ring, and more the preferred level of functionality is 3 to about 15 functional groups per polymer molecule.

The plasticizer of the present invention is a salt of a fatty acid. The fatty acid comprises from 4 to about 20 carbon atoms which are predominately in a saturated straight chain configuration, with a terminal carboxylic acid. The preferred salt is a metal salt, and the preferred metal ion is zinc. Zinc stearate is the preferred plasticizer.

The amount of plasticizer preferred is from about 10 to about 70 parts by weight of plasticizer for each 100 parts by weight of functionalized polymer. Larger amounts of plasticizer will not disperse in the functionalized polymer composition and will therefore tend to be detrimental to ultimate mechanical properties of the composition. Lesser amounts do decrease the viscosity of polymeric melts of the functionalized block copolymers, but do not reduce the viscosity by the desired amount. From about 20 to about 50 parts by weight of plasticizer is more preferred because of the improved reinforcing filler effect within this range.

The plasticizer may be added to the functionalized block copolymer by any known means. Solution blending is acceptable, but melt blending is preferred due to lower operating costs and excellent tensile strengths which have been achieved by melt blending these plasticizers with functionalized block copolymers. Milling, kneading, Banbury mixing, plasticating extrusion, and the like are acceptable mixing methods. Twin screw extrusion at mixing temperatures of 150°-200° C. are preferred.

These plasticizers function as reinforcing fillers because they are substantially compatible with the functionalized block copolymers. Whether a plasticizer is substantially compatible is determined by the inclusion of copolymer in plasticizer domains as determined by dynamic mechanical testing and electron micrographs of compression molded samples stained with ruthenium tetraoxide.

The composition of the present invention may, of course, further comprise additives and components known to be useful in elastomeric block copolymer compositions. These other components include non-reactive homopolymers or copolymers of alpha olefins or aromatics. The amount of non-reactive polymer is 100 parts by wt or less and preferably 1 to 50 parts by weight. Fillers, reinforcing materials such as silica, carbon black, glass fibers, organic fibers, calcium carbonate and the like, nucleating agents, lubricants, pigments, extender oils, stabilized inhibitors of oxidative, thermal and ultraviolet light degradation, antioxidants, ignition retardants, mold release agents and/or crosslinking agents, colorants including dyes and pigments and nucleating agents may also be included.

The compositions of the present invention can be molded or formed into useful articles by using, for example, conventional molding, injection molding, blow molding, pressure forming, rotational molding and the like. Examples of the articles are sheets, films, foamed products and injection-molded articles having various shapes. These articles can be used in the fields of, for example, automobile parts, electrical parts, mechanical parts, footwear, medical equipment and accessories, packaging materials, building materials and the like.

The use of the plasticizers of the present invention permits processing of ionomers of block copolymers of vinyl aromatics and conjugated diolefins in commercial polymer processing equipment and additionally increasing the modulus and tensile strength of the resultant compositions at temperatures at and below about 70° C. Incorporation of the plasticizer of this invention in compositions of salt functionalized polymers also results in a less expensive composition than the unplasticized composition due to the low costs of many salts of fatty acids.

The plasticized compositions of the present invention additionally possess a very desirable shear rate-viscosity relationship. The viscosity of the compositions decrease significantly with increasing shear rate which is a desirable characteristic.

EXAMPLES

In these examples, tensile stress at break was determined by ASTM-D412 using a shortened "D" dumbell die (L=1.6 cm as opposed to 3.3 cm). Test specimens were about 0.02 to about 0.05 cm in thickness. A crosshead speed of 1 inch per minute was used. The effective gauge length (i.e., the separation distance between the clamps) was 1.625 inches. Samples were evaluated on an Instrom 1123 testing machine. Plaques having a thickness of 40 to 60 mils were molded from extruded pellets at 240° C. for 15 minutes.

Viscosity measurements were made utilizing an Instron Capillary Rheometer in accordance with ASTM D-3835-79. Plunger speed was varied from 0.1 to 2 inches per minute to obtain a range of shear rates. The capillary measured 0.06 inches in diameter and 2 inches in length. The rheological measurements were determined on polymer extruded through a 15 mm Baker Perkins twin screw extruder at 275 rpm at 250° C. and subsequently pelletized.

A base block copolymer of styrene and butadiene was utilized in each of the following examples. The base block copolymer had a number average molecular weight of about 51,500 and was 30% by weight styrene. The base block copolymer had a polystyrene-polybutadiene-polystyrene structure. The end blocks were of approximately equal molecular weight. The polymer had been selectively hydrogenated. More than 98 percent of the initial ethylenic unsaturation had been saturated while more than 95 percent of the initial aromatic unsaturation remained after hydrogenation.

A sample of the hydrogenated base block copolymer was carboxylated by metalation with s-butyllithium, and then reacting the metalated polymer with carbon dioxide. This was accomplished in a 5% by weight solution of hydrogenated base polymer in cyclohexane. N,N,N',N'-tetramethylethylenediamine was used as a metalation promoter in the concentration of 9 parts by weight based on 100 parts by weight of hydrogenated base polymer. As an indicator, 1,1-diphenylethylene was added to the solution in an amount of 14 grams per 100 lbs of hydrogenated base polymer. The solution was heated to 50° C. and titrated with s-butyllithium to remove impurities as indicated by a change to a yellow/orange color. Metalation was accomplished by adding about 27 parts by weight based on 100 parts by weight of hydrogenated base polymer of a solution of s-butyllithium. The solution was 12 percent by weight s-butyllithium in cyclohexane. This solution was added over a 15 minute period.

The metalated polymer solution was then transferred to a closed vessel containing a $CO_2$/THF mixture to carboxylate the lithium sites forming lithium carboxylate salts. About 17 parts by weight based on 100 parts by weight of the base polymer of acetic acid was then added to acidify the carboxylate salt. The acidified polymer was recovered by steam coagulation and dried in a vacuum oven. The acid functionalized polymer contained 1.15 percent by weight of bound carboxyl acid functionality which was at least 94 percent grafted to the styrene blocks.

The zinc ionomer of the carboxylated polymer was then prepared by dissolving the carboxylated polymer in THF and adding aqueous zinc acetate solution. The amount of zinc added was about 500% of a stoichiometric amount. Greater than about 90 percent of the carboxylic acid functionality was converted to carboxylate zinc salt.

EXAMPLE 1

This example demonstrates the effect of zinc stearate content on the tensile properties of the modified and unmodified polymers. Samples of the polymers with zinc stearate were prepared by mixing in a twin screw extruder forming pellets and then compression molding the pellets to form the sample specimens. Samples of the polymers which did not contain zinc stearate were compression molded directly. Tensile stress to break was determined at room temperature, 70° C. and 100° C. for molded films of the modified polymer containing 30 percent by weight of zinc stearate. Corresponding samples were prepared and tested with unmodified polymer for comparison. The results are summarized in Table 1.

The addition of zinc stearate did not significantly alter the tensile strength of the modified block copolymer at ambient temperature. However, at 30 weight percent zinc stearate, the tensile strength of the unmodified polymer was significantly reduced. This result can be attributed to the gross phase separation of the zinc stearate from the polymer.

At 70° C. the addition of zinc stearate to the unmodified polymer also was detrimental to the tensile strength due to the inadequate dispersion of the zinc stearate in the block copolymer. Conversely, the tensile strength of the modified polymer was significantly higher at 70° C. with the addition of 30 percent by weight zinc stearate.

At 100° C., the addition of zinc stearate did not significantly alter the tensile strength of the unmodified polymer. Conversely, when compared to the unmodified polymer without Zn stearate, the tensile strength of the modified polymer with zinc stearate was substantially reduced compared to the modified polymer without the zinc stearate. This result is to be expected because the melting point of the stearate is about 100° C. and at this temperature the zinc stearate ceases to function as a reinforcing filler.

This example demonstrates that below the melting point of the plasticizer the plasticizer of this invention can function as a reinforcing filler in blends of the modified polymers of this invention thus enhancing the mechanical properties of the blend composition. This example also suggests that above the melting temperatures of the plasticizer, the plasticizer of this invention can cause a drastic break up of ionic associations of the modified polymer rendering these blend compositions more processable.

TABLE 1

| Copolymer | % w Zn Stearate | Tensile Stress at Break (psi) | | |
|---|---|---|---|---|
| | | Room Temp. | 70° C. | 100° C. |
| Unmodified | 0 | 4920 | 210 | 40 |
| Modified | 0 | 3815 | 585 | 270 |
| Unmodified | 30 | 655 | 140 | 35 |
| Modified | 30 | 4655 | 1925 | 60 |

EXAMPLE 2

The melt viscosities of the modified polymer and the unmodified polymer were determined for compositions containing 30 percent weight zinc stearate and without zinc stearate. The viscosities were determined as a function of shear rate, and the results are summarized in Table 2. This example demonstrates a significant reduction in viscosity as a result of incorporating zinc stearate in compositions comprising the modified polymer of the present invention.

TABLE 2

| Copolymer Tensile Strength | % w Zn Stearate | Viscosity poise × $10^3$ | Shear Rate $sec^{-1}$ |
|---|---|---|---|
| Unmodified | 0 | 5.17 | 2.4 |
|  |  | 3.87 | 6.0 |
|  |  | 3.24 | 12.1 |
|  |  | 2.96 | 24.4 |
|  |  | 2.97 | 61.1 |
|  |  | 2.49 | 122.7 |
|  |  | 2.36 | 245.9 |
|  |  | 1.92 | 612.2 |
| Modified | 0 | 2240 | 1.2 |
|  |  | 1510 | 2.4 |
|  |  | 767 | 6.0 |
|  |  | 587 | 8.4 |
|  |  | 439 | 12.1 |
|  |  | 252 | 24.3 |
| Unmodified | 30 | 1.62 | 6.0 |
|  |  | 1.27 | 8.4 |
|  |  | 1.13 | 12.0 |
|  |  | 1.12 | 24.3 |
|  |  | 1.53 | 61.0 |
|  |  | 1.40 | 122 |
|  |  | 1.28 | 245 |
|  |  | 1.19 | 612 |
| Modified | 30 | 31.3 | 2.4 |
|  |  | 12.5 | 6.0 |
|  |  | 9.87 | 12.0 |
|  |  | 10.3 | 24.3 |
|  |  | 7.63 | 61.0 |
|  |  | 5.71 | 122 |
|  |  | 4.02 | 244 |
|  |  | 2.28 | 611 |

We claim:

1. A composition consisting of:
    a) 100 parts by weight of a phase separated functionalized block copolymer consisting of at least two blocks which consist of vinyl aromatic monomer units and at least one block which consists of hydrogenated conjugated diolefin monomer units and carboxyl salt functionality primarily located in at least one vinyl aromatic block; and
    b) from about 10 to about 70 parts by weight of zinc stearate; and
    c) wherein at least 98% of the conjugated diolefin units in the block copolymer are hydrogenated.
2. The composition of claim 1 wherein the functionalized block copolymer comprises between about 1 and about 60 weight percent of vinyl aromatic monomer units.
3. The composition of claim 1 wherein the vinyl aromatic is styrene.
4. The composition of claim 1 wherein the conjugated diolefin is butadiene.
5. The composition of claim 1 wherein the conjugated diolefin is isoprene.
6. The composition of claim 1 wherein the functionalized block copolymer is a functionalized triblock block copolymer comprising endblocks which are predominantly vinyl aromatic hydrocarbon blocks and a midblock which is predominantly a conjugated diolefin hydrocarbon block.

* * * * *